United States Patent [19]

Kluksdahl

[11] Patent Number: 4,588,566

[45] Date of Patent: May 13, 1986

[54] EXTRACTION OF LITHIUM FROM LITHIUM-CONTAINING MATERIALS

[75] Inventor: Harris E. Kluksdahl, San Rafael, Calif.

[73] Assignee: Chevron Research Company, San Francisco, Calif.

[21] Appl. No.: 757,875

[22] Filed: Jul. 23, 1985

[51] Int. Cl.$^4$ ............................................. C01D 15/02
[52] U.S. Cl. .................................. 423/179.5; 423/421
[58] Field of Search ............................... 423/179.5, 421

[56] References Cited

U.S. PATENT DOCUMENTS

| | | | |
|---|---|---|---|
| 2,983,576 | 5/1961 | Robinson | 423/179.5 |
| 3,073,673 | 1/1963 | Chubb | 423/179.5 |
| 3,099,527 | 7/1963 | Howling | 423/179.5 |
| 3,131,022 | 4/1964 | Archambault | 423/179.5 |
| 3,189,407 | 6/1965 | Botton et al. | 423/179.5 |
| 3,523,751 | 8/1970 | Burkert et al. | 423/179.5 |
| 4,124,684 | 11/1978 | Olivier et al. | 423/179.5 |

FOREIGN PATENT DOCUMENTS

| | | | |
|---|---|---|---|
| 610971 | 12/1960 | Canada | 423/179.5 |
| 711662 | 6/1965 | Canada | 423/179.5 |
| 970992 | 9/1964 | United Kingdom | 423/179.5 |
| 1024361 | 3/1966 | United Kingdom | 423/179.5 |

Primary Examiner—John Doll
Assistant Examiner—Wayne A. Langel
Attorney, Agent, or Firm—Burns, Doane, Swecker & Mathis

[57] ABSTRACT

This invention relates to the separation of lithium from lithium-containing materials, primarily ores such as hectoritic montmorillonite, having about 0.02 to 2.0 percent lithium by weight. The process comprises reducing the particle size of the material to less than about 500 microns; slurrying the particles with an aqueous base consisting of carbonates or hydroxides of sodium or potassium; heating the resulting slurry at about 50° to 125° C. for from about 0.1 to 6 hr; separating the solids and acidifying the solids with aqueous sulfuric acid to a pH value of about 0 to 2; heating the acidified slurry at about 50° to 125° C. for about 0.5 to 10 hr; separating the residual solids from the aqueous phase; separating the liquid portion of the cooled slurry, which is treated with sodium hydroxide, potassium hydroxide or calcium hydroxide and then with sodium carbonate or potassium carbonate with heating to remove interfering alkaline earth metals, cooling and separating the aqueous phase followed by treatment with sufficient alkali carbonate to precipitate the lithium carbonate with filtering of the hot slurry to remove the lithium as solid lithium carbonate. Lithium and its compounds have a variety of uses ranging from a component of a lightweight electric storage battery to pharmaceuticals used in the treatment of depression and other diseases.

19 Claims, 1 Drawing Figure

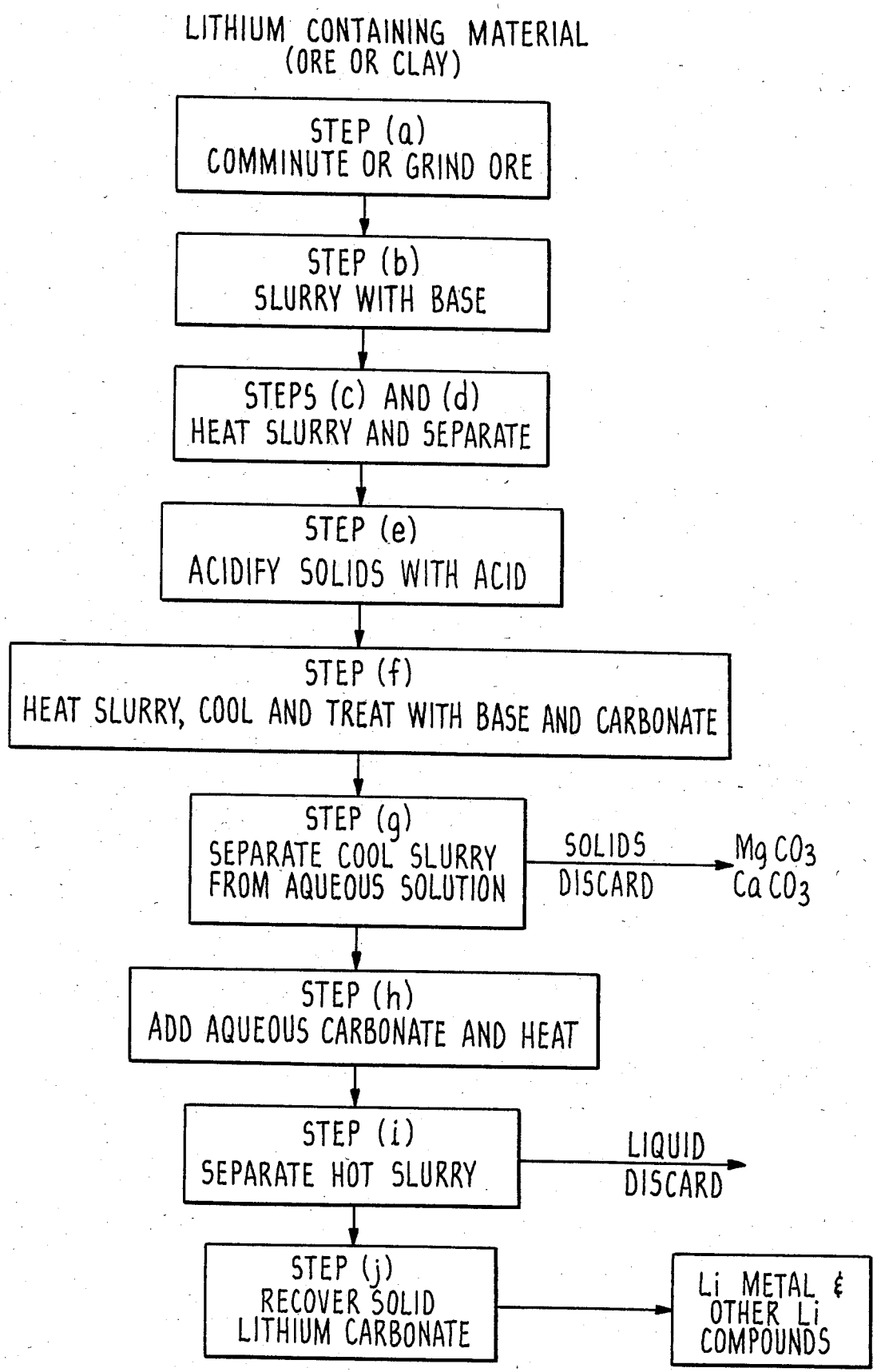

EXTRACTION OF LITHIUM FROM LITHIUM-CONTAINING MATERIALS

FIELD OF THE INVENTION

This invention relates to the extraction of lithium from lithium-containing materials, ores or minerals having low concentrations of lithium by weight. More particularly, it concerns a process for the recovery of lithium from the lithium-containing material, clay or ore, (e.g., smectite, montmorillonite, hectorite), usually having a lithium concentration of about 0.02 to 2.0% by weight of ore, by reducing the material to small particles, reaction with base and mild heat, separation of the solids, reaction of the solids with acid and mild heat, cooling the slurry and treatment with base and alkali carbonate, followed by cooling and separation of the liquid phase, and reaction of the liquid phase with alkali carbonate with heating and filtering of the hot slurry to recover the lithium, as solid lithium carbonate. The present methods of extraction of lithium from ores involve high temperature processing, which tends to be a more expensive process. Lithium and its compounds have a variety of uses ranging from a component of lightweight electrical storage batteries to the treatment of depression and other disorders in human beings.

Lithium metal may find extensive use in lightweight electrical storage batteries, because of the renewed interest in the manufacture and use of electric automobiles. Therefore, a new process to efficiently recover lithium from previously intractable ores is particularly valuable.

BACKGROUND OF THE INVENTION

Related Art

A number of processes have been proposed to recover lithium from lithium-containing minerals. For example, in U.S. Pat. No. 2,974,884 Martin and Lanbolt disclose a process wherein lithium is recovered from spodumene and minerals consisting of lithia, silica and alumina. "Spodumene" refers to a white to yellowish-purplish- or emerald-green clinopyroxene igneous mineral occurring in prismatic crystals, and may also be known as triphane. It has a general formula of $LiAlSi_2O_6$, a hardness of 6.5 to 7 (on Moh's scale), and a specific gravity of 3.13-3.20. Usually, the ore contains about 0.1-4 percent by weight of $Li_2O$. This patent is concerned with recovery of lithium from a finely ground concentrated spodumene ore by use of sulfuric acid in a closed container under high pressure and high temperature, namely over 50 psig and 250° to 450° C. The concentrated spodumene is obtained by grinding the ore material to about 60 mesh, flotation treating (such as with ½ to 5 pounds of a higher fatty acid derived from tall oil and ½ to 3 pounds of methyl isobutyl carbinol flotation agent, per ton of ore) to provide a slime, concentrate and a tails component. The concentrate and slime are then reground to produce a mix for the high pressure sulfuric acid recovery. The ground ore may be treated with an aqueous cleansing or conditioning solution, such as an aqueous solution of sodium hydroxide, at a rate of 1-8 pounds per ton of ore. This process is disadvantageous in requiring many steps, including a flotation process, as well as high temperatures and pressures.

In U.S. Pat. No. 3,007,770, Kawecki and Cole disclose the extraction of lithium from a spodumene ore involving heating the spodumene in the crushed state to a temperature of at least about 1000° up to 1300° C. The product is then treated with hydroxide or carbonate of sodium or potassium. The resulting slurry is treated with dilute sulfuric acid to a pH value not lower than 4.2, followed by treatment with hydrogen peroxide. This procedure is also disadvantageous in that it requires heating to over 1000° C. to render the spudomene ore amenable to further chemical reaction.

In U.S. Pat. No 3,189,407, Betton et al. disclose the separation of lithium from lepidolite ore and similar complex minerals. The process involves, first, reaction of the mineral with 65-75 percent by weight aqueous sulfuric acid at about 140° to 200° C. The slurry obtained is filtered, and the lithium is recovered by treatment with carbonate as the lithium carbonate. Again, this process requires high slurry temperatures which are expensive, both as to heat and acid consumption.

In this application, a lithium-bearing trioctahedral smectite, a member of the montmorillonite group of clay minerals, is the source of lithium. A major deposit of hectoritic montmorillonite clay is the McDermitt Caldera complex on the Nevada-Oregon border, which because of its size contains a significant percentage of the world's supply of lithium. The clay is a complex and variable solution and/or intimate physical mixture of solid montmorillonite clay component end members of which hectorite is typically a major constituent. Glanzman and Rytuba discuss the McDermitt Caldera geology in "Zeolite Clay Mineral Zonation of Volcaniclastic Sediments Within the McDermitt Caldera Complex of Nevada and Oregon", *U.S. Geological Survey Open-File Report* No. 79-1668 (1980) and detail the mineral zonation of the McDermitt Caldera complex. Previous attempts to extract the lithium from these clays by hydrometallurgical procedures have been unsuccessful.

For instance, Starkey, et al. in *Journal Research U.S. Geol. Survey*, Vol. 5, No. 2, March-April, pp. 235-242 (1977) disclose the treatment of a hectorite-like ore with acids and with 2.5N sodium hydroxide. The sodium hydroxide treatment is indicated to have no more effect on the release of lithium from hectorite-like ore than distilled water, sea water, or sodium chloride solution.

May et al., in "Extracting Lithium from Clays by Roast Leach Treatment", ROI 8432, U.S. *Bureau of Mines Report* (1980) disclose an investigation of the extraction of lithium from clay from the northern and southwestern sections of the McDermitt Caldera. Lithium extractions using sulfuric acid were obtained ranging from 60-90% from the clay from the northern part (McDermitt A sample). In contrast, the clay from the southwestern part (McDermitt B sample) was much more resistant to extraction using dilute sulfuric, and no more than 1% of the lithium was removed. In two experiments, McDermitt B hectoritic montmorillonite clay at a 10% solids level was treated with sulfuric acid of pH of 1 for three hr, probably at ambient temperature. In the first experiment, 226 pounds of $H_2SO_4$ was required per ton of clay and the lithium extraction is 0.7 percent. In the second experiment 451 pounds of sulfuric acid were added per ton of clay and a 1.1 percent of lithium extraction was obtained. Higher lithium extractions were obtained using very large amounts of sulfuric acid and/or using extremely high temperature roasting treatments (of the order of 500° to 1000° C.). However, none of the approaches described by May et al. appear to be economically feasible to recover the lithium in useful form.

The recovery of lithium from various sources is also reviewed in "Lithium and Lithium Compounds" by R. Bach, pp 448–476 in Kirk-Othmer: *Encyclopedia of Chemical Technology*, 3rd Ed, Vol 14, published in 1980 by John Wiley and Sons, Inc. of New York, N.Y. None of the references described above disclose methods comparable in effectiveness of the present invention to extract lithium from low grade lithium ores.

This invention provides a new process of general applicability for obtaining lithium from material having a low concentration of lithium, (e.g., recycle operations from spent batteries) and particularly lithium-containing ores and clays (smectite, montmorillonite or hectorite), whereby lithium can be recovered without the use of high temperatures and pressures and at relatively low cost. Further, this process provides an alternative method for obtaining lithium carbonate from richer lithium ores for a variety of subsequent uses.

SUMMARY OF THE INVENTION

The present invention provides a process for recovering lithium from a material containing a low concentration of lithium. The method comprises:

(a) reducing the material or ore to small particles having an average diameter of about 500 microns or finer;

(b) slurrying these particles with an aqueous solution of base where the base is selected from the group consisting of sodium carbonate, sodium hydroxide, potassium carbonate and potassium hydroxide;

(c) heating the slurry obtained at conditions of time, preferably from about 0.1 to 6 hours, and temperature not in excess of 125° C., preferably above 40° C., sufficient to convert a substantial portion of the lithium component to its respective hydroxide or carbonate derivative or to some lithium material which dissolves readily in acid, optionally cooling the slurry;

(d) separating the solids and liquid of step (c);

(e) reacting the solids of step (d) with sulfur acid to pH of about 0 to 2;

(f) heating the slurry of step (e) at about 50° to 125° C. for between about 0.5 to 10 hr. followed by cooling and treating the cool slurry with sodium hydroxide, potassium hydroxide or calcium hydroxide to pH of about 7 and sodium carbonate or potassium carbonate to pH of about 12;

(g) filtering the cool slurry of step (f);

(h) reacting of the resultant solid-free aqueous phase with sufficient aqueous alkali carbonate to precipitate lithium carbonate with heating at between about 50° to 125° C. for between about 1.0 to 10 hr;

(i) separating the hot slurry of step (h) to recover the lithium value as solid lithium carbonate.

In another aspect, the process is used to recover lithium from a comminuted solid material containing lithium compounds of at least 0.1 percent by weight of lithium where at least 90% of the comminuted solid has a particle size of less about 500 microns.

Additional preferred embodiments include as starting materials the clays, montmorillonite and hectoritic montmorillonite.

In another embodiment, the lithium is present in the ore at about 0.02 to 2.0 percent by weight.

A preferred embodiment is the process where in step (c) the particles are slurried with a base at a temperature of about 85° C. for a time of about 3 hr.

An additional embodiment is heating the slurry of step (b) at conditions of time and temperature sufficient to convert a substantial portion of the lithium compounds to their base derivatives.

An additional embodiment includes in step (f) the treatment of the slurry with sodium hydroxide, potassium hydroxide or calcium hydroxide and sodium carbonate or potassium carbonate with boiling of the slurry for 5 hr, and in step (h) after adding the alkali carbonate, the solution is heated at about 100° C. for 5 hr.

DESCRIPTION OF THE DRAWING

The FIGURE illustrates the practice of this invention in a process flow scheme for recovering lithium from lithium-containing materials, especially ores. The Step (a), (b), (c), etc. designations are keyed to the description in claim 1 and thereafter.

DETAILED DESCRIPTION OF THE INVENTION AND PREFERRED EMBODIMENTS

The process as indicated above is applicable to ores or minerals containing low concentrations of lithium and is especially applicable to the recovery of lithium from clays (smectite, montmorillonite, hectorite), which heretofore has been particularly resistant to the recovery of their lithium component.

Preferably, the present process is applied to the recovery of lithium from low lithium-content ores, where lithium is present in about 0.02 to 2 percent by weight, particularly as in a clay, comprising primarily smectite.

Description of the Process

In the practice of the present invention, as shown in the flow diagram in the FIGURE, as Step (a), the lithium-containing material (usually a lithium ore or clay and hereinafter referred to as "ore") is reduced to a small particle size. The ores may include smectite, montmorillonite and hectorite-like ores which have the following properties:

"Smectite" refers to a broad category of dioctahedral (such as montmorillonite) and trioctahedral (saponite) clay minerals, and their chemical varieties characterized by swelling properties and high cation-exchange capacities.

"Montmorillonite", refers to, as a subgroup of smectite, a group name for all clay minerals with an expandible structure, except vermiculite. Montmorillonite has the general formula $Al_2O_3.4SiO_4.H_2O$. The term includes the end member, "hectorite". Generally, about one-sixth of the aluminum atoms are replaced by magnesium atoms and varying amounts of hydrogen, sodium, potassium, calcium, lithium and magnesium are combined.

"Hectorite", in a strict sense, refers to a trioctahedral clay mineral, as a subgroup of montmorillonite clays, composed of a hydrogen silicate of magnesium and lithium. A general formula for hectorite is $(Mg,Li)_3Si_4O_{10}(OH)_2$. Lithium is usually present in an ore concentration of between about 0.2 to 0.6 percent by weight. In this invention, a preferred material is a hectorite-like montmorillonite ore.

The reduction in size of the ore may be accomplished by any of the methods known in the art, such as crushing, or grinding, as in a ball mill, hammermill or the like. The useful particles are those which have an average size of about 500 microns or finer.

The ore particles obtained above are then slurried with an aqueous solution of a base, which is selected from sodium carbonate, sodium hydroxide, potassium carbonate, potassium hydroxide or soda ash, indicated in the drawing as Step (b). The concentration of the base may be about 0.01 to 1N, usually about 0.1N. The slurry so obtained is usually about 5 to 20% solids, preferably about 10%, and is heated about 50° to 125° C. for about 0.1 to 6 hr, preferably about 85° C. for about 3 hr, Step (c) of the FIGURE. For temperatures above about 100° C., the heating and cooling of the slurry occurs in a sealed pressure vessel.

The basic slurry is optionally cooled, then filtered or allowed to settle to accomplish the separation to remove the excess base, as shown in the FIGURE as Step (d). Optionally, the solids are water washed at this point to remove excess base. The solids are next acidifed using a strong acid, such as sulfuric acid, Step (e) of the FIGURE. If the slurry is gelatinous, a filter aid such as CELITE may be used in the separation of the solids. The pH of the slurry is maintained between about 0 to 2, usually about pH of 1. The acid treated slurry is then heated from about 50° to 125° C. for about 0.5 to about 10 hr, preferably about 85° C. for about 3 hr, Step (f) of the FIGURE. The pressure obtained when the sealed reaction vessel containing the slurry is heated at 125° C., is about between 1 and 2 atmospheres. In most cases it is necessary to add more acid to the slurry during the reaction to maintain the pH at about 1. In step (f), after heating, the slurry may be treated hot, or preferably is cooled to about ambient temperature, and treated with strong base, preferably sodium hydroxide [NaOH], potassium hydroxide [KOH], lime [Ca(OH)$_2$] or mixtures thereof to a pH of about 7 followed by alkaline carbonate, preferably sodium carbonate [soda ash] or potassium carbonate to a pH of about 12.

The slurry obtained in step (g) is cooled and filtered. The interfering alkaline earth metal carbonates (e.g. Mg, Ca) are precipitated and removed as solids. This step takes advantage of the fact that lithium carbonate is fairly insoluble about 100 C, but is fairly soluble at ambient temperature. The aqueous filtrate is subsequently treated with an aqueous alkali carbonate, if needed [Step (h) of the FIGURE]. These carbonates include, but are not limited to, ammonium carbonate, sodium carbonate or potassium carbonate. The product of lithium carbonate is subsequently separated from the hot aqueous solution which is heated to between about 50° and 125° C. for between about 0.5 and 10 hr, preferably between about 80° and 100° C. for between about 2 and 4 hr, as a white solid usually by filtration, as indicated in the FIGURE as Step (i). Sufficient alkali carbonate is used to precipitate the lithium carbonate in the aqueous sample, usually at a pH of about 12. This step takes advantage of the fact that lithium carbonate is substantially insoluble in water at about 80° to 100° C., but is soluble at ambient temperature and pressure.

Lithium carbonate may be the product of choice or may be used as the starting material to prepare other lithium compounds of commercial interest, particularly the lithium metal.

This invention is further described by the following examples which are provided to illustrate the invention and are not to be construed as limiting the invention's scope.

EXAMPLE 1

Recovery of Lithium from Hectoritic Montmorillonite Clay

Hectoritic montmorillonite clay, 300 g from the southern portion of the McDermitt Caldera on the Nevada-Oregon border is subjected to grinding using a ball mill for 5-10 min. The particles obtained are sieved to obtain particles having an average size of 500 microns or finer, 200 g (containing 0.70 g of lithium).

The particles obtained are subjected to 2000 ml of an aqueous solution of 0.1N sodium hydroxide in a 5 liter glass vessel. The slurry obtained is heated for 1 hr at 85° C.

The slurry is cooled and filtered. The solids are contacted with 7.2 ml of concentrated (95%) sulfuric acid, carefully added dropwise, with stirring to neutralize the solids. The pH of the slurry containing about 10% solids is then maintained at 1.0, and heated at 85° C. for 3 hr with continuous stirring. An additional 36.6 ml of 3N sulfuric acid is used to maintain the pH of the slurry at 1.0.

After acidification, the slurry is heated at 100° C. for 5 hr, and cooled to ambient temperature. The cooled slurry is treated with lime to pH about 7 and soda ash to pH about 12 and heated to 100° C. for 4 hr. The slurry is filtered cold to remove unreacted solids and magnesium and calcium carbonate. The solution (Q) obtained is treated with sodium carbonate to pH of about 12, heated to about 95° C. and filtered hot. Lithium carbonate is a white granular solid which is separated hot by filtration and dried to give a white solid in high yield.

EXAMPLES 2-10

Extraction of Lithium with Sodium Hydroxide

In Examples 2-10 in Table 1 show the use of sodium hydroxide as the reagent for caustic pretreatment of the McDermitt hectorite-like lithium-containing clay. The procedure of Example 1 is followed with substitution of the concentrations of acid and base and at the times and temperatures given in Table 1. As shown, the recovery of lithium in solution Q is good in Examples 2-10. The recovery of lithium carbonate using sodium carbonate proceeds in high yield.

TABLE 1

Extraction of Lithium Using a Caustic (NaOH) Pretreatment Followed By An Acid Leach

| | Caustic Pretreatment[a] | | | Neut.[b] | Acid Leach[c] | | | |
|---|---|---|---|---|---|---|---|---|
| Ex. | NaOH (ml/N) | Temp. (°C.) | Time (hr) | $H_2SO_4$ (ml) | $H_2SO_4$ (ml) | $H_2SO_4$ (°C.) | Time (hr) | Lith. Extracted[d] (%) |
| 2 | 225/0.1 | 87 | 3.0 | 7.2 | 36.6 | 87 | 3.0 | 24.1 |
| 3 | 225/0.1 | 85 | 3.0 | 8.3 | 75.1 | 85 | 3.0 | 66.2 |
| 4 | 225/0.1 | 85 | 3.0 | 9.3 | 43.3 | 95 | 3.0 | 46.1 |
| 5[e] | 230/0.1 | 125 | 0.1 | 8.9 | 50.1 | 125[e] | 0.5 | f |
| 6[e] | 220/0.1 | 125 | 0.1 | 8.2 | 49.2 | 50 | 10.0 | f |
| 7[e] | 220/0.1 | 125 | 6.0 | 7.7 | 48.3 | 100[e] | 2.0 | f |
| 8[e] | 220/0.1 | 125 | 6.0 | 7.8 | 47.2 | 125[e] | 10.0 | f |
| 9 | 220/0.1 | 50 | 0.1 | 7.5 | 50.9 | 125[e] | 0.5 | f |

TABLE 1-continued

Extraction of Lithium Using a
Caustic (NaOH) Pretreatment Followed By An Acid Leach

| Ex. | Caustic Pretreatment[a] NaOH (ml/N) | Temp. (°C.) | Time (hr) | Neut.[b] $H_2SO_4$ (ml) | Acid Leach[c] $H_2SO_4$ (ml) | $H_2SO_4$ (°C.) | Time (hr) | Lith. Extracted[d] (%) |
|---|---|---|---|---|---|---|---|---|
| 10 | 220/0.1 | 50 | 0.1 | 7.4 | 50.5 | 125[e] | 10.0 | f |

[a]Conditions of caustic pretreatment (Steps b and c of Example 1): 10% solids, stirred slurry, 25 g of clay.
[b]Neutralization using concentrated sulfuric acid (Step d of Example 1).
[c]Conditions of acid leach (Step e of Example 1): 10% solids, stirred slurry, pH maintained at 1 by acid addition, (3 N sulfuric acid).
[d]% Lithium extracted based on solution Q lithium content.
[e]Heating above 100° C. in a pressure vessel.
[f]Lithium recovery is expected to be comparable to the recovery of Examples 2, 3 & 4.

EXAMPLES 11-19

Extraction of Lithium with Potassium Hydroxide

Examples 11-19 in Table 2 show the use of potassium hydroxide, rather than sodium hydroxide, as the reagent for caustic pretreatment of the clay, McDermitt hectorite-like ore. The procedure of Example 1 is followed with substitution of the concentrations of acid and base and at the times and temperatures recited in Table 2. As shown, the recovery of lithium in solution Q is good in Examples 11-19. The recovery of lithium carbonate using sodium carbonate proceeds in high yield.

TABLE 2

Extraction of Lithium Using a
Caustic (KOH) Pretreatment Followed By An Acid Leach

| Ex. | Caustic Pretreatment[a] KOH (ml/N) | Temp. (°C.) | Time (hr) | Neut.[b] $H_2SO_4$ (ml) | Acid Leach[c] $H_2SO_4$ (ml) | $H_2SO_4$ (°C.) | Time (hr) | Lith. Extracted[d] (%) |
|---|---|---|---|---|---|---|---|---|
| 11 | 225/0.1 | 85 | 3.0 | 7.4 | 46.2 | 85 | 3.0 | f |
| 12 | 225/0.1 | 85 | 3.0 | 8.1 | 74.3 | 85 | 3.0 | f |
| 13 | 220/0.1 | 50 | 6.0 | 8.3 | 53.9 | 85 | 3.0 | f |
| 14[e] | 230/0.1 | 125 | 0.1 | 8.9 | 50.9 | 125[e] | 0.5 | f |
| 15[e] | 220/0.1 | 125 | 0.1 | 8.2 | 49.1 | 50 | 10.0 | f |
| 16[e] | 220/0.1 | 125 | 6.0 | 7.7 | 47.0 | 100[e] | 2.0 | f |
| 17[e] | 220/0.1 | 125 | 6.0 | 7.8 | 46.1 | 125[e] | 10.0 | f |
| 18 | 220/0.1 | 50 | 0.1 | 7.5 | 49.9 | 125[e] | 0.5 | f |
| 19 | 220/0.1 | 50 | 0.1 | 7.4 | 51.1 | 125[e] | 10.0 | f |

[a]Conditions of caustic pretreatment (Steps b and c of Example 1): 10% solids, stirred slurry, 25 g of clay.
[b]Neutralization using concentrated sulfuric acid (Step d of Example 1).
[c]Conditions of acid leach (Step e of Example 1): 10% solids, stirred slurry pH maintained at 1 by acid addition (3 N sulfuric acid).
[d]% Lithium extracted based on solution Q lithium content.
[e]Heating above 100° C. in a pressure vessel.
[f]Lithium recovery is expected to be comparable to the recovery of Examples 2, 3, & 4.

EXAMPLES 20-28

Extraction of Lithium using Sodium Carbonate and Potassium Carbonate

Examples 20-24 in Table 3 show the pretreatment use of carbonate, rather than sodium hydroxide, as the reagent for caustic pretreatment of the clay, hectorite. In Examples 25-28 in Table 3 are shown the pretreatment use of potassium carbonate, rather than sodium hydroxide, as the reagent for caustic pretreatment of the ore, McDermitt hectorite-like ore. The procedure of Example 1 is followed for these Examples with substitution of the concentrations of acid and bases and at the times and temperatures recited in Table 3. As shown, the recovery of lithium in solution Q is good in Examples 20-28. The recovery of lithium carbonate using sodium carbonate proceeds in high yield.

TABLE 3

Extraction of Lithium Using a
Caustic ($Na_2CO_3$ or $K_2CO_3$) Pretreatment Followed By An Acid Leach

| Ex. | Caustic Pretreatment[a] Base (ml/N) | Temp. (°C.) | Time (hr) | Neut.[b] $H_2SO_4$ (ml) | Acid Leach[c] $H_2SO_4$ (ml) | $H_2SO_4$ (°C.) | Time (hr) | Lith. Extracted[f] (%) |
|---|---|---|---|---|---|---|---|---|
| 20[d] | 225/0.1 | 85 | 3.0 | 7.6 | 46.9 | 85 | 3.0 | h |
| 21[d] | 225/0.1 | 85 | 3.0 | 8.3 | 74.7 | 85 | 3.0 | h |
| 22[d] | 220/0.1 | 50 | 6.0 | 8.1 | 53.5 | 85 | 3.0 | h |
| 23[d] | 230/0.1 | 125[g] | 0.1 | 8.9 | 50.8 | 125[g] | 0.5 | h |
| 24[d] | 220/0.1 | 125[g] | 0.1 | 8.2 | 49.4 | 50 | 10.0 | h |
| 25[e] | 220/0.1 | 125[g] | 6.0 | 7.7 | 47.9 | 100 | 2.0 | h |
| 26[e] | 220/0.1 | 125[g] | 6.0 | 7.8 | 47.5 | 125[g] | 10.0 | h |
| 27[e] | 220/0.1 | 50 | 0.1 | 7.5 | 50.0 | 125[g] | 0.5 | h |

TABLE 3-continued

Extraction of Lithium Using a
Caustic (Na$_2$CO$_3$ or K$_2$CO$_3$) Pretreatment Followed By An Acid Leach

| | Caustic Pretreatment[a] | | | Neut.[b] | Acid Leach[c] | | | |
|---|---|---|---|---|---|---|---|---|
| Ex. | Base (ml/N) | Temp. (°C.) | Time (hr) | H$_2$SO$_4$ (ml) | H$_2$SO$_4$ (ml) | H$_2$SO$_4$ (°C.) | Time (hr) | Lith. Extracted[f] (%) |
| 28[e] | 220/0.1 | 50 | 0.1 | 7.4 | 50.1 | 125[g] | 10.0 | [h] |

[a]Conditions of caustic pretreatment (Steps b and c of Example 1): 10% solids, stirred slurry, 25 g of clay.
[b]Neutralization using concentrated sulfuric acid (Step d of Example 1).
[c]Conditions of acid leach (Step e of Example 1): 10% solids, stirred slurry, pH maintained at 1 by acid addition (3 N, H$_2$SO$_4$).
[d]Examples 20–24 use sodium carbonate.
[e]Examples 25–28 use potassium carbonate.
[f]% Lithium extracted based on lithium content in solution Q.
[g]Heating above 100° C. in a pressure vessel.
[h]Lithium recovery is expected to be comparable to the results of Examples 2, 3 & 4.

EXAMPLE 29

Extraction of Lithium [Hectorite-like Ore Treated With Caustic (NaOH)]

(a) McDermitt hectorite-like clay, 300 g (from the southern portion of the McDermitt Caldera on the Nevada-Oregon border) is subjected to pulveration using a ball mill for 5 to 10 minutes. The particles obtained are sieved to obtain particles having an average size of about 500 microns or finer, 200 g (containing 0.70 g of lithium), as shown in the FIGURE as Step (a). The particles obtained are subjected to 2000 ml of an aqueous solution of 0.1N sodium hydroxide in a 5 liter glass vessel, Step (b). The slurry obtained is heated for 1 hr at 85° C. The slurry is cooled and filtered, Step (c). The solids are contacted with 7.2 ml of concentrated (95%) sulfuric acid carefully added dropwise with stirring to neutralize the solids. The pH of the slurry containing about 10% solids is then maintained at 1.0, and heated at 85° C. for 3 hr with continuous stirring. An additional 36.6 ml of 3N sulfuric acid is used to maintain the pH of the slurry at 1.0, Step (e).

The cooled slurry is treated slowly with solid lime to pH of 7 and soda ash to pH of 12 with heating for 2 hr at 100° C., Step (f).

The slurry is cooled and filtered, and the solids are discarded, Step (g). The aqueous filtrate (solution Q) is treated with 1N sodium carbonate to pH of 12 with stirring at 20° C. and heated at 100° C. for 2 hr, Step (h). Lithium carbonate precipitates from the hot aqueous solution as a white granular solid, which is separated by filtration from the hot liquid, step (i), and dried to give a white solid, Step (j).

(b) The lithium removal from an ore sample having 0.02 percent by weight content of lithium according to step (a) of this Example proceeds well with high recovery of lithium as lithium carbonate.

(c) The lithium removal from an ore sample having a 2.0 percent by weight content of lithium accordig to step (a) of this Example proceeds well with high recovery of lithium as lithium carbonate.

EXAMPLE 30–33

Comparative Example

Hectoritic montmorillinite of the type described in Example 1 above is slurried with 0.1N sulfuric acid for 3 hr at ambient temperature at a solids content of about 10%. The pH is maintained at about 1.0 by adding additional sulfuric acid. The solids are separated and the filtrate is analyzed for lithium. The results found in Table 4 below indicate the refractory nature of this clay to acid.

TABLE 4

Extraction of Hectoritic Montmorillonite Using 0.1 N Sulfuric Acid

| Ex. No. | (Size) Conditions | % Li Extracted | Consumption (meq/g) |
|---|---|---|---|
| 30 | >60 mesh | 1.9 | 6.7 |
| 31 | <400 mesh | 1.7 | 5.7 |
| 32 | <100 mesh[a] | 2.3 | 0.2 |
| 33 | <100 mesh[b] | 2.4 | 7.6 |

[a]Precalcined at 1000° C. for 2 hr.
[b]Pretreated in microwave oven 100° C. one-half hr.

EXAMPLE 35

Comparative Example

400 Mesh hectoritic montmorillonite of the type described in Example 31 above was treated with 0.1N sulfuric acid for three hr, except that the temperature was 89° C. The lithium extraction is 4.0 percent and 7.26 meq/g of 0.1N sulfuric acid was consumed.

While the present invention has been described with reference to the specific embodiments thereof, it will be understood by those skilled in this art that various changes may be made and that equivalent steps may be substituted without departing from the true spirit and scope of the present invention. All such modifications or changes are intended to be included within the scope of the following claims.

What is claimed is:

1. A method for recovering lithium from a material containing a low concentration of lithium, which method comprises:
   (a) reducing the material to small particles having average diameter of about 500 microns or finer;
   (b) slurrying the particles of step (a) with an aqueous solution of base wherein said base is selected from the group consisting of sodium carbonate, sodium hydroxide, potassium carbonate and potassium hydroxide;
   (c) heating the slurry of step (b) at about 50° to 125° C. for about between about 0.1 to 6 hr;
   (d) separating the solids and liquid of step (c);
   (e) acidifying the solids of step (d) with aqueous sulfuric acid to pH of about 0 to 2;
   (f) heating the slurry of step (e) at between about 50° to 125° C. for between about 0.5 to 10 hr followed by cooling and treating the slurry with sodium hydroxide, potassium hydroxide or calcium hydroxide to pH of about 7 and sodium carbonate or potassium carbonate to pH of about 12;

(g) filtering the cool slurry of step (f);
(h) reacting of the liquid phase of step (g) with a sufficient aqueous alkali carbonate to precipitate lithium carbonate and heating to between about 60° to 125° C. for between about 0.5 and 10 hr; and
(i) separating the hot slurry of step (h) to recover the lithium value as solid lithium carbonate.

2. The process of claim 1 wherein the material is a lithium-containing clay.

3. The process of claim 2 wherein in the clay, lithium is present in about 0.02 to 2 percent by weight.

4. The process of claim 3 wherein in the clay, lithium is present at about 0.1 to 2 percent by weight.

5. The process of claim 4 wherein the clay is smectite.

6. The process of claim 5 wherein in step (c) the particles are slurried at about 85° C. for about 3 hr.

7. The process of claim 6 wherein in step (f) the slurry is heated at about 85° C. for about 3 hr.

8. The process of claim 7 wherein in step (b) the base is sodium hydroxide.

9. The process of claim 8 wherein the base is present in about 0.1N concentration.

10. The process of claim 9 wherein the lithium containing material is the clay hectoritic montmorillonite.

11. A method for recovering lithium from a comminuted solid material containing lithium compounds of at least 0.1 percent calculated as lithium wherein at least 90% of said comminuted solid material has a particle size of less than about 500 microns, which method comprises:
(a) comminuting the solid material;
(b) slurrying the comminuted material with an aqueous solution of base selected from the group consisting of carbonates and hydroxides of sodium and potassium;
(c) heating the slurry resulting from step (b) at conditions of time and temperature sufficient to convert a substantial portion of said lithium compounds to a form that will dissolve in acid;
(d) separating the resulting solids and liquid;
(e) acidifying the resulting base-treated solids with aqueous sulfuric acid to a pH of 0 to 2;
(f) heating the acidified slurry at about 50° to 125° C. for about 0.5 to 10 hr sufficient to solubilize the lithium compounds contained therein, and then treating the resultant slurry with sodium hydroxide, potassium hydroxide, or calcium hydroxide to pH of about 7 and sodium carbonate or potassium hydroxide to pH of about 12;
(g) separating the residual solids from the cool aqueous slurry;
(h) treating the resulting solids-free separated aqueous phase with sufficient aqueous alkali carbonate to precipitate the lithium carbonate; and
(i) heating the resultant solution between about 75° and 100° C. recovering solid lithium carbonate from the hot carbonate-treated aqueous phase.

12. The process of claim 11 wherein the material is a lithium-containing clay.

13. The process of claim 12 wherein in the clay, lithium is present in about 0.02 to 2 percent by weight.

14. The process of claim 13 wherein in the clay, lithium is present at about 0.1 to 2 percent by weight.

15. The process of claim 14 wherein the clay is hectoritic montmorillonite.

16. The process of claim 15 wherein in step (c) the particles are slurried at about 85° C. for about 3 hr.

17. The process of claim 16 wherein in step (f) the slurry is heated at about 85° C. for about 3 hr.

18. The method of claim 11 wherein step (c) of heating the slurry is for a time ranging from between about 0.1 to 6 hr and a temperature of 50° to 125° C.

19. The process of claim 18 wherein the base treated slurry after heating in step (d) is water washed to remove excess base before being acidified.

* * * * *